May 17, 1927. 1,628,845
C. W. JACKSON
WOODWORKING MACHINE
Filed March 13, 1925 4 Sheets-Sheet 1
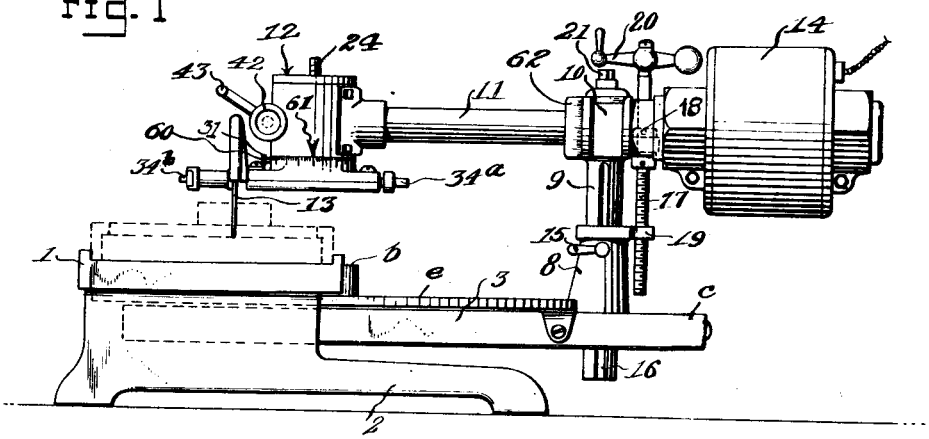
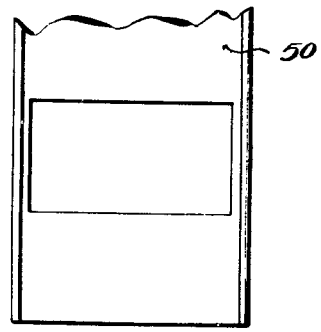
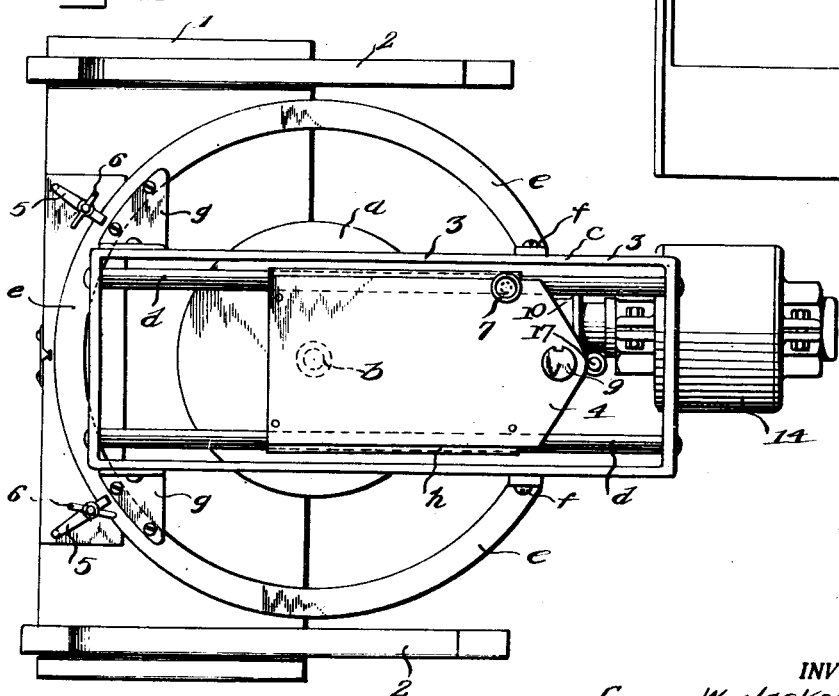
INVENTOR.
C. W. Jackson.
ATTORNEY May 17, 1927.

C. W. JACKSON 1,628,845

WOODWORKING MACHINE

Filed March 13, 1925 4 Sheets-Sheet 2

INVENTOR.
C. W. Jackson

ATTORNEY

May 17, 1927.　　　　　C. W. JACKSON　　　　　1,628,845
WOODWORKING MACHINE
Filed March 13, 1925　　　　4 Sheets-Sheet 3
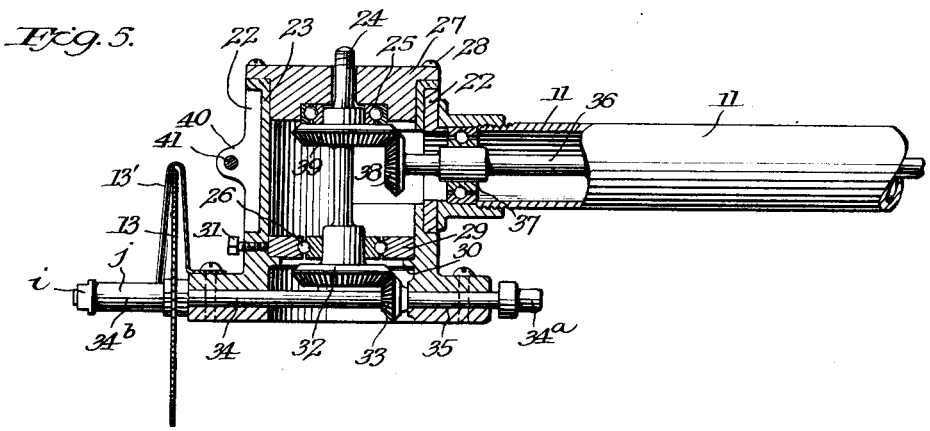
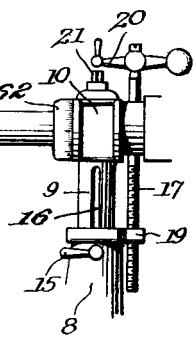
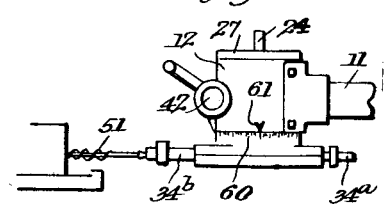
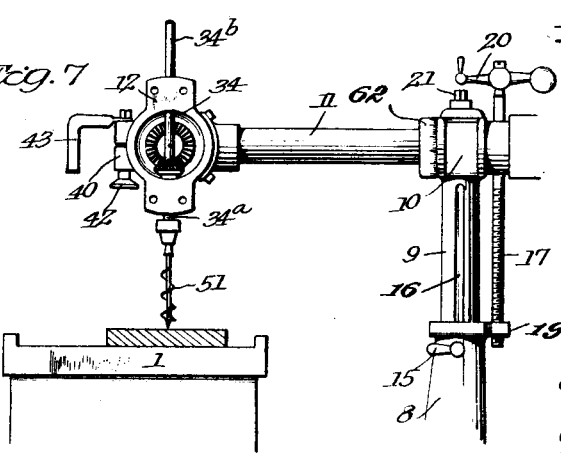
INVENTOR.
C. W. Jackson
BY
ATTORNEY May 17, 1927.
C. W. JACKSON
1,628,845
WOODWORKING MACHINE
Filed March 13, 1925 4 Sheets-Sheet 4
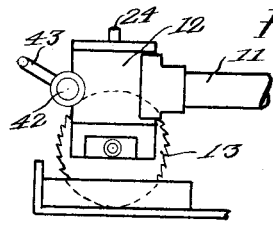
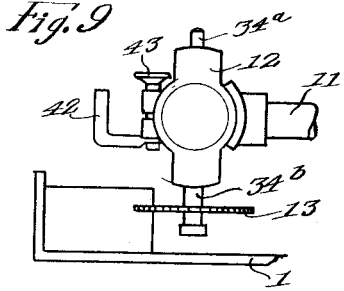
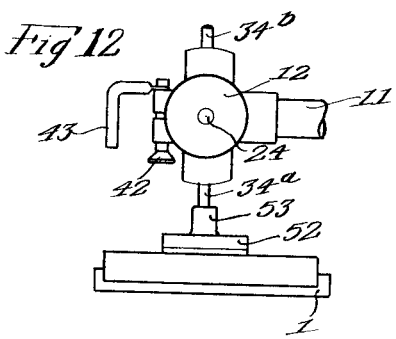
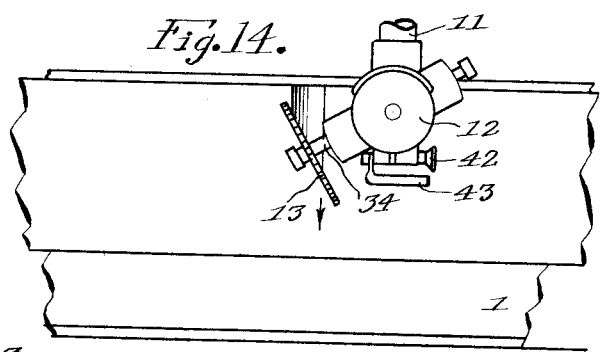
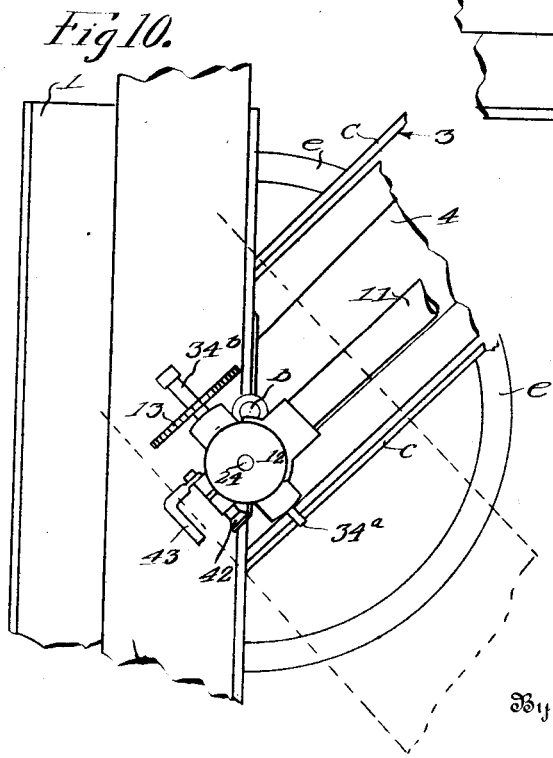
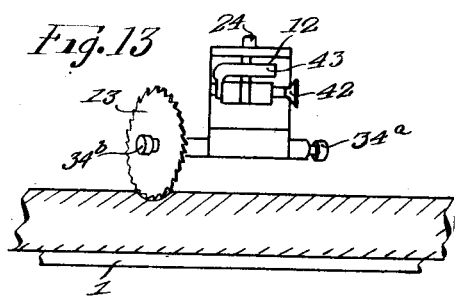
Inventor
C. W. Jackson
Attorney Patented May 17, 1927.

1,628,845

UNITED STATES PATENT OFFICE.

CLARENCE W. JACKSON, OF SEATTLE, WASHINGTON, ASSIGNOR OF ONE-HALF TO CHARLES BILDERBACK, OF SEATTLE, WASHINGTON.

WOODWORKING MACHINE.

Application filed March 13, 1925. Serial No. 15,316.

The present invention is a wood-working machine of the character which can be used for sawing, routing or boring. This machine is constructed to be adjusted to various positions to accomplish these purposes, and for operation at various angles, thus adapting it to a variety of work.

The object of the invention is a machine of the above-stated character which is power-driven and can be made in various sizes, both of a portable type and of a larger or semi-portable type, and has simplicity of construction, and at the same time has a maximum of adjustability.
The invention resides particularly in the sundry details of construction, combination and arrangement of parts which permit the various adjustments of the machine for the various characters of work to which it is susceptible.

In this specification and the annexed drawings, the invention is disclosed in the form in which it is considered to be the best, but the invention is not limited to such form because it is capable of being embodied in other forms; and it is to be understood that in and by the claims following the description herein it is intended to cover the invention in whatever form it may embody within the scope thereof.

In the drawings, which show the preferred embodiment of the invention as at present devised:—

Figure 1 is a side elevation of the cutting machine showing the tool member adjusted in one of its positions.

Fig. 2 is a bottom plan of the machine shown in Fig. 1 illustrating details of construction.

Fig. 5 is an enlarged fragmentary detail sectional view of the tool driving means and of the adjustable tool head.

Figure 3:
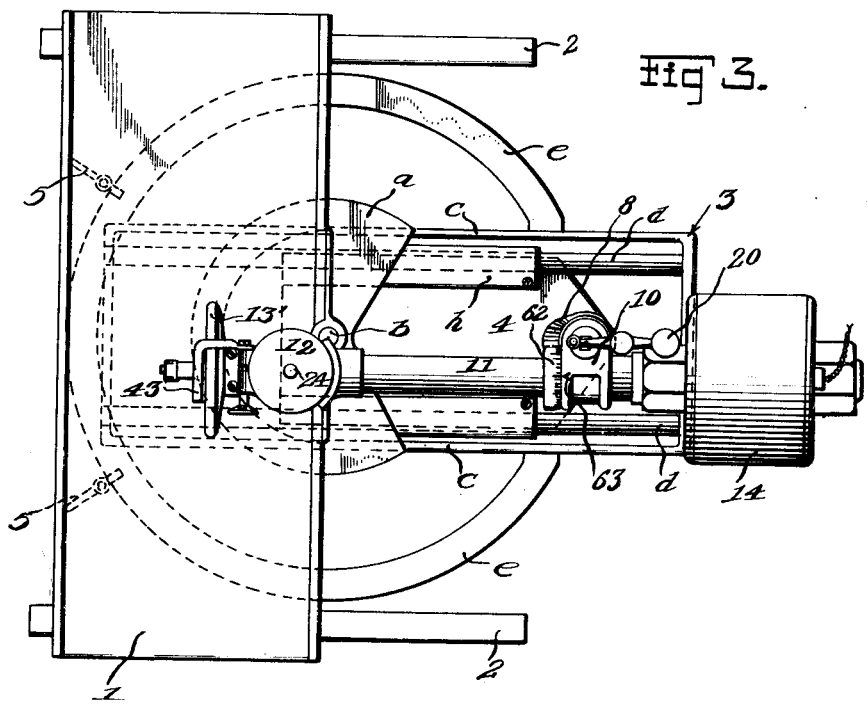
Fig. 3 is a plan view of the machine shown in Fig. 1.

Fig. 6 is a side elevation of the tool supporting and operating parts showing the same in one of its adjustable positions, and presenting the tool to the work, Fig. 7 is a similar view to Fig. 6 showing another adjusted position of the tool supporting and operating parts, and Figures 8 to 14 inclusive are diagrammatic views illustrating some of the positions the machine may assume to perform certain work.

Figure 15 is a fragmentary plan view of a supporting frame which may be placed upon the work table for supporting the work and having an opening thereon for preventing the cutting tool from cutting or marring the work table.

Referring particularly to the drawings in which like characters designate similar parts referred to in this specification, 1 indicates a table or work support which is here shown as having leg or base members 2 constructed to suitably support the entire machine. Pivotally mounted, preferably to the rear of the table 1, at an edge thereof, is a rotatable protractor frame 3, this frame slidably supporting a carriage 4 upon which are mounted the tool operating parts. The frame 3 being rotatable with respect to the table 1 permits angular adjustments of the tool supporting means with respect to the table, and the slidability of the tool operating parts on the frame permits the tool to be moved with respect to the surface of the table during the cutting operation.

In the present embodiment the frame 3 consists of a plate $a$ pivotally supported at $b$ to the rear edge of the work table 1, and having an elongated rectangular frame $c$ secured thereto, which has a pair of spaced parallel guide rails $d$ mounted therein and coextensive with the length thereof. In order that the pivotal adjustment of the frame 3 may be accurately made and determined, a circular or arcuate member $e$ is supported by the frame 3 to lie under the table 1 and is of such construction or diameter to have part of its peripheral edge normally visible at the front edge of the table 1, the peripheral edge of the member $e$ having thereon a suitable scale which will cooperate with a suitable scale or stationary point on the edge of the table to determine the degree of pivotal adjustment of the frame 3. To lock the frame in its pivoted adjustment with respect to the table, clamps 5 are mounted on the under face of table 1, and are adapted to be brought in binding relation with the arcuate member $e$ by means of the thumb screws 6. The arcuate member $e$ is fastened by suitable means, such as screws $f$, at its ends to the frame $c$, and at its front end is here shown as secured by the angular plates $g$.

The carriage 4 has suitable guides $h$ which slide upon the guide rails $d$. These guides may consist merely of plates, rollers or roller bearings, and any adjusted position of the carriage 4 may be maintained by at least one lock screw 7, threaded in the carriage and adapted to bind against the guide rail $d$.

The carriage 4, preferably, is provided with a tubular boss or sleeve member 8 at a rear portion thereof, which slidably receives the vertical supporting rod or spindle 9 of the tool operating parts. The supporting spindle 9 carries at its upper end a split clamp or bearing 10, in which is rotatably journaled a tubular horizontal arm 11, capable of being rotated therein.

The rotative movement of the arm 11 on the bearing 10 permits the arm to be adjusted to various positions. These positions can be maintained by tightening the bolt or nut 21, which in the present construction shown, tightens the bearing or clamp 10 to tighly grip around the arm 11. However, any other form of lock for the adjustment can be provided without departing from the spirit of the invention.

The arm 11 has mounted on one end what is here termed as the tool-head 12, through which power is transmitted to the saw or cutting-tool 13, and which is so constructed as to permit the tool to be rotated about an axis substantially at right angles to the axis of the tool. This movement of the tool-head, together with the rotatability of the arm 11 and the other various adjustments of the machine, permit the substantial universal movement and adjustment of the cutting tool.

On the other end of the arm 11 is mounted means through which power may be transmitted to the tool. This means, in the present form of the invention, comprises, preferably, an electric motor 14. The spindle 9 is held against rotation in the tubular boss 8 by an adjustable key 15 which takes the form of a threaded bolt mounted in the boss and extending into the keyway 16 in the spindle. The adjustable key also serves the purpose of locking the spindle in its vertical adjusted positions with respect to the boss 8. Vertical adjustments of the spindle 9 are obtained by the micrometer adjusting means comprising the threaded rod 17 swivelly journaled in a bracket 18 on the spindle, and having its threaded end engaged in a threaded opening in a bracket 19 made fast to or stationary with the tubular boss 8.

For convenience of adjustment the upper end of the rod 17 extends above the arm 11 and is provided with a suitable handle 20 for effecting a ready and quick rotation of the rod 17.

The tool-head 12 is here shown as consisting of a split band 22 suitably rigidly mounted to the end of the arm 11 by coupling means 11ª. Mounted with the band 22 in concentric and juxta relation therewith is a sleeve 23. (See Figure 5.) Within the sleeve 23 is disposed a shaft 24 suitably journaled at its ends in anti-frictional bearings 25 and 26, suitably mounted within the sleeve. The bearing 25 is shown as mounted in a plate 27 adapted to cover one end of the sleeve and having a flanged edge to overlie the edge of the sleeve to be secured by suitable fastenings 28 thereto. The shaft 24 has its adjacent end extending through an opening in the plate 27. The bearing 26, however, is shown as being mounted in a plate 29 positioned in the other end portion of the sleeve 23 and resting on an internal shoulder 30. The plate 24 may be further maintained in position by the screw 31 extending therein through the side walls of the sleeve 23. The sleeves 22 and 23 are provided with aligned slots or openings 22ª and 23ª, respectively, which when in alignment, permit a shaft 36 to extend therethrough, the slot 23ª being of such length as will permit the rotatable adjustment of the said sleeves with respect to each other for the purpose of the invention.

The bearing 26 has the adjacent end of the shaft 24 extending therethrough, which has mounted on the extremity thereof a beveled gear 32 meshing with a gear 33 on the shaft 34 journalled in bearing 35 on the opposite end of the sleeve 23 and extending substantially at right angles to the axis of the sleeve 23. The end portions of the shaft 34 project beyond the bearings 35 for the purpose of receiving tools thereon. Power is transmitted to the shaft 34 by the shaft 36 within the tubular arm 11 and coextensive therewith. The shaft 36 is driven from the motor 14, at one end thereof, or from a pulley or other suitable means which may be substituted for the motor, and is journaled in the arm in anti-frictional bearings 37. The other end of the shaft 36 carries a gear 38 meshing with a gear 39 fast on the shaft 24, and preferably disposed between the bearings 25 and 26.

It will thus be observed that the construction of the tool-head is such that the sleeve 23 will rotate within the band 22 and that the tool shaft 34 will be driven irrespective of the rotation or adjustment of the sleeve 23. As above stated the band 22 is preferably split and the split edges thereof are provided with outstanding lugs 40 having openings therein through which extends a bolt 41. A hand wheel 42 is mounted on one end of the bolt for closing or spreading the split ends of the band 22. This operation will cause the band 22 to bind against the sleeve 23 and prevent further rotation of the same, or will release the sleeve for further adjustment. A suitable handle 43 is mounted on the band for the purpose of reciprocating the carriage 4 on the guides $d$ and thereby move the cutting head back and forth across the work table as operations require.

The end 34ᵃ of the shaft 34 is particularly adapted for receiving a boring bit or drill (see Fig. 7) and the end 34ᵇ is adapted to receive a circular saw 13 (see Fig. 1) or a routing tool 13″ (see Fig. 6) or other suitable rotatable woodworking implement. This end 34ᵇ is preferably longer than the end 34ᵃ and has its extremity threaded to receive the nut i. A suitable spacing tube or shim j is also provided to fill the space between the nut and the tool, when required. A number of spacers or shims j, of varying sizes and lengths, may be employed for purposes which are readily understood.

A saw guard 13′ is provided for obvious purposes, but can be readily detached from the head 12 when necessary.

The operation of the device may be briefly stated as follows:

The arbors 34ᵃ and 34ᵇ upon which the tools may be placed, are susceptible to rotatable horizontal adjustment about the tool head 12 and this adjustment may be determined by a suitable scale 60 which cooperates with a fixed point or scale 61. The adjustment of the tool is further susceptible to vertical angular variance by the rotative adjustment of the arm 11 which adjustment may be determined by a scale 62 cooperating with a fixed point 63. These two adjustments which are at right angles to each other give the cutting tool a wide range of angularity, such as to render the tool substantially universal in its adjustment.

The elevation of the tool is determined by the operation of the handle 20 which rotates the threaded rod 17. By this means microscopic vertical adjustments are obtained.

As before stated the tool and the adjustments above described are all independent of the adjustments of the protractor or supporting frame 3 and may be supplemental thereto to accomplish certain work. The adjustments of this frame permit the tool to be set at various angles with respect to the work and the work table for miter cutting and grooving and for square cuts and grooving. The movement of the tool with respect to the work is permitted by the slidability of the carriage 4 on the protractor frame 3.

In order that an understanding may be had of the functions of the machine and some of the uses to which it may be put, reference may be had to the Figures 1, 3, 4, 6 to 14, inclusive. Figs. 8 to 14 are more or less diagrammatical for the purpose of illustrating the various positions which the tool may assume.

Figure 4:
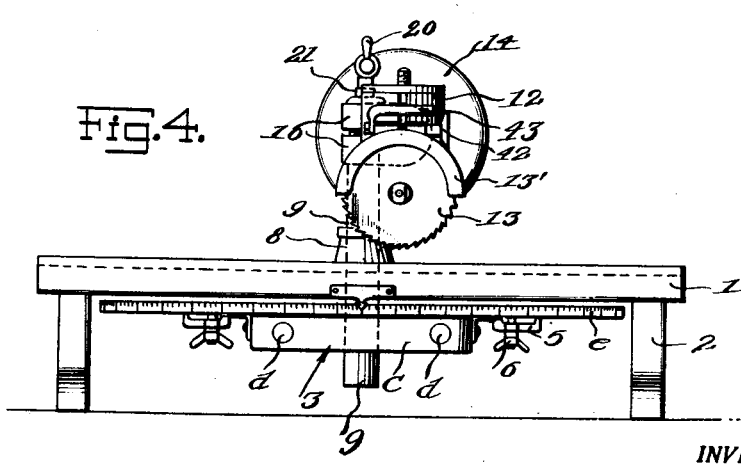
Fig. 4 is a front elevation of the machine as shown in Fig. 1.

For ripping, the saw 13 is adjusted to the position illustrated in Figs. 1, 3 and 4 and is vertically adjusted by the operation of the handle 20 to rip the material. This adjustment may be such as to prevent the saw from cutting the table, or an additional frame 50 may be placed upon the table 1, which has a slotted center permitting the saw to extend therethrough (see Figs. 1 and 15). The tool may also assume this position for grooving when the routing tool is used. It is understood, of course, that the work will be moved in relation to the tool.

For cross-cut sawing or routing, the tool may assume the position shown in Fig. 8 in which case the tool is moved across the work by pulling the handle 43, permitting the carriage 4 to be reciprocated. For bevel ripping or grooving the tool may assume the position shown in Fig. 6. This is permitted by rotating the arm 11 to a position 90° of that shown in Fig. 1 and correspondingly adjusting the sleeve 23 in the tool head. The elevation of the tool is, of course, obtained through the operation of the handle 20. For edge grooving the tool may assume the position indicated in Fig. 9. For angle or miter cutting or routing, for such as used in stair work and trimming, the tool may be adjusted to any one of several positions as indicated in Fig. 10. This is accomplished by swinging the entire protractor or supporting frame 3 about the pivot b at any point in an arc of 90° more or less. The correct angle may be determined by the scale on the arc member e cooperating with the pointer or other suitable scale on the front edge of the table 1.

In addition to the adjustments which may be made as generally indicated at Fig. 10, it will be obvious that by rotatably adjusting the arm 11 in its bearing 10, beveled miter cuts and grooves may be made.

Fig. 7 shows the device adjusted for boring downwardly in which case a suitable bit or drill, as requirements may demand, is applied to either arbor 34ᵃ or 34ᵇ and the tool head 12 suitably adjusted as indicated. The boring operation may be completed by suitable operation of the crank handle 20 for feeding the tool head 12 and the bit 51 during the operation.

In Fig. 11 is shown another position at which boring may be accomplished. This position of the tool head is the same as shown in Fig. 1, in which case the advancement of the tool is controlled by the operator grasping the handle 43 and moving the carriage 4 on its guides d. It will be obvious that in this position, boring at an angle with respect to the work, may be accomplished by suitable adjustment of the protractor 3 on the pivot b, the correct angle being obtained by the scale on the arc e.

A disc sander device 52 may be employed by applying the same at its socket end 53 to the arbor 34ᵃ. The sanding operation may be accomplished when the tool head 12 is in the positions shown in Figs. 7 and 11, the same as used for boring.

The position the tool may assume for grooving round bottomed grooves is diagrammatically illustrated in Figs. 13 and 14. These grooves, of course, may be made at various angles with respect to the work by adjustments of the supporting frame on the pivot $b$ and the width of the grooves may be varied by angular adjustment of the cutting tool 13 in the head 12, with respect to its direction of movement and the size of the tool used. In this case the tool is moved across the work by reciprocation of the carriage 4.

The above illustrations are merely given so that a clear understanding may be had of some of the operations and uses to which the present device is susceptible. There are numerous other purposes and operations in which the tool may be used and which will present themselves to and be understood by those skilled in the art.

Having thus described the invention what is claimed as new and desired to secure by Letters Patent is:

1. A woodworking machine comprising a vertical adjustable support, a horizontal arm mounted for rotatable adjustment about a horizontal axis on said support, means for holding the arm in adjusted positions, a coupling means fixedly mounted on an end of said arm, a tool head supported by said coupling means and rotatably adjustable about an axis at right angles to the rotatable adjustment of the arm, a tool-arbor journalled in the tool-head at an angle to the rotation of the head, means for holding said tool-head parts in adjusted positions, and means for actuating said arbor in its journals.

2. A woodworking machine comprising a support including a horizontal arm rotatably adjustable about a horizontal axis, a movable protractor frame on the support carrying said arm for horizontal reciprocation, a tool head fixedly mounted on an end of said arm, a tool arbor journalled in the head in a plane substantially parallel with said arm and bodily adjustable about an axis at right angles to the axis of adjustment of said tool head support arm; means for maintaining said parts in adjusted positions, means for rotating said arbor axially, and means at the vicinity of the tool-head whereby it may be manually moved, actuated or guided during the operation of the tool thereof on the work, according to the desired adjustment which shall have been made on the parts of the machine.

3. A woodworking machine comprising a work support, a tool-head disposed to be moved over and with respect to the work support, a vertically adjustable horizontal supporting arm rotatably adjustable about a horizontal axis, a pivoted protractor frame mounted on said support and underlying the same, said frame carrying said arm and movable about an axis at right angles to the rotatable adjustment of said arm, and a tool arbor journalled in the head and bodily adjustable about an axis at right angles to the axis of adjustment of said arm, means maintaining said parts in adjusted positions, means mounted on said arm and connected with said arbor for rotating the same about its axis.

4. A wood working machine comprising a work support, a tool-head, disposed to be moved over and with respect to said work support, a vertically adjustable horizontal supporting arm for said tool-head and rotatably adjustable about a horizontal axis, a protractor frame pivotly mounted on the support and underlying the same and movable about an axis at right angles to the rotatable adjustment of said arm, a carriage mounted for horizontal reciprocal movement on said protractor frame and carrying said support arm, and a tool arbor journalled in the head and bodily adjustable about an axis at right angles to the axis of adjustment of said arm, means maintaining said parts in adjusted positions, means mounted on said arm and connected with said arbor for rotating the same about its axis, and means at the vicinity of the tool-head whereby it may be manually moved, actuated or guided during the operation of the tool thereof on the work, according to the desired adjustment which shall have been made on the parts of the machine.

5. A woodworking machine comprising a tool-head, a support for the head rotatably adjustable about a horizontal axis, a tool arbor journaled in the head and bodily adjustable about an axis at right angles to the said horizontal axial adjustment of said head, a movable protractor frame, and a carriage mounted for reciprocal movement on the protractor and carrying said rotatable head support, said head support being vertically adjustable.

6. A woodworking machine comprising a work-table, a protractor frame pivoted to the table, said frame underlying the table, means for maintaining said frame in adjusted position, a carriage slidably mounted on the frame, a vertically adjustable support on the carriage, a tool-head and a motor carried by said support, and an operative connection between said motor and tool-head.

7. A wood-working machine comprising a work-table, a protractor frame pivoted to the table, said frame underlying the table, means for maintaining said frame in adjusted positions, a carriage slidably mounted on the frame, a spindle vertically slidably mounted on said carriage, a threaded rod swivelly mounted on the spindle and threaded in an opening on the carriage, an operating handle for the rod, a tool-head and a motor carried by said support, and an operative connection between said motor and tool-head.

8. A woodworking machine comprising a work-table, a protractor frame pivotally mounted with respect to the table and under the latter, a carriage slidably mounted on the frame, an upstanding vertically adjustable support with said tool-head positioned above the work table on the carriage, a tool-head and motor carried by said support, a tool arbor journaled in said tool-head, and an operative connection between said motor and said arbor.

9. A woodworking machine, a pivotally mounted protractor frame, a carriage slidably mounted on said frame, an adjustable support on the carriage, a tool-head and a motor carried by said support, a tool arbor journalled in said tool-head and operative connection between said motor and said arbor, the tool-head being bodily rotatably adjustable about an axis, a portion of said tool-head carrying said arbor being rotatably adjustable about an axis at substantially right angles with respect to the axis of rotatable adjustment of the tool-head, and said arbor being disposed at substantially right angles with respect to the axis of adjustment of said portions of said tool-head.

10. A wood working machine comprising a vertically adjustable support, a tubular arm horizontally journalled intermediate its ends on said support, a tool head mounted on one end of said arm and rotatably adjustable by the movement of said arm, a shaft journalled longitudinally within the arm, a tool-arbor journalled in said head and having operative connection with said shaft, and a motor mounted on the other end of said arm and connected to said shaft, the portion of said head carrying said arbor being rotatably adjustable about an axis at substantially right angles to the axis of said arm, and said arbor being disposed at an angle with respect to the axis of adjustment of said head portion.

11. In a cutting machine, a tool-head comprising two concentric nested sleeves rotatable relative to each other, a shaft mounted longitudinally in and supported by the inner sleeve, the outer sleeve adapted to be fixed to the machine, a tool arbor journalled on the inner sleeve at right angles to said shaft and having an operative connection therewith irrespective of the relative movement of the sleeves, said sleeves having aligned slots in said side walls to permit the introduction of actuating means for said first shaft.

12. In a cutting machine, as set forth in claim 11, the tool-head being further characterized by means for maintaining said sleeves in their relative adjusted positions.

13. In a cutting machine as set forth in claim 11 further characterized by the outer sleeve being split and means for spreading and closing the outer sleeve upon the inner sleeve whereby the latter is released or clamped in adjusted positions.

14. In combination, a rotatable horizontal arm, a pair of concentric nested sleeves rotatable relative to each other and disposed at right angles to said arm, one of said sleeves being rigid with said arm, a tool arbor journaled on the other of said sleeves and extending at substantially right angles to the axis of the latter, and a rotatable shaft longitudinally disposed within the sleeves and supported by said sleeves and operatively connected with said arbor irrespective of the relative movement of the sleeves.

15. In combination, a rotatable horizontal arm, a pair of concentric nested sleeves rotatable relative to each other and disposed at right angles to said arm, the one of said sleeves being rigid with said arm, a tool arbor journalled on the other of said sleeves and extending at substantially right angles to the axis of the latter, and a rotatable shaft longitudinally disposed within said sleeves and supported by said sleeves and operatively connected with said arbor irrespective of the relative movement of the sleeves, a drive shaft journalled in said arm and extending through said sleeves and having operative connection with said first mentioned shaft without hindering the relative movement of said sleeve.

16. A wood-working machine comprising a supporting frame including a work support, a tool-head for supporting a tool and disposed to be movable with respect to the work support, supporting means for said head, a connection between the supporting means and machine whereby the tool-head supporting means may be bodily shifted to various degrees of angularity with respect to the work support, means for adjusting the tool head about an axis at right angles to the axis of the tool thereof, said head being adjustable about an axis at substantially right angles to the axis of said last mentioned adjustment, said tool-head supporting means including means permitting reciprocable movement of the supporting means in the linear direction of angular adjustment of the latter with respect to work support, a handle on said head for permitting a manual movement of the head in performing the operations of the machine and means for adjusting the elevation of the tool-head with a feeding movement.

In testimony whereof I have hereunto set my hand.

CLARENCE W. JACKSON.